United States Patent [19]

Jackson, Jr. et al.

[11] 4,140,846
[45] Feb. 20, 1979

[54] LIQUID CRYSTAL COPOLYESTERS CONTAINING 4-CARBOXYBENZENEPROPIONIC ACID

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 902,574

[22] Filed: May 4, 1978

[51] Int. Cl.² ............................................. C08G 63/18
[52] U.S. Cl. ..................................... 528/193; 528/271
[58] Field of Search ............... 260/47 C; 528/193, 271

[56] References Cited

U.S. PATENT DOCUMENTS 3,368,998  2/1968  Goodman et al. ................... 528/193

Primary Examiner—Lester L. Lee
Attorney, Agent, or Firm—Charles R. Martin; Daniel B. Reece, III

[57] ABSTRACT

Disclosed are liquid crystal copolyesters having enhanced heat stability. The copolyesters are prepared from 4-carboxybenzenepropionic acid, a diacyl ester of hydroquinone and a p-acyloxybenzoic acid and contain the following divalent radicals:

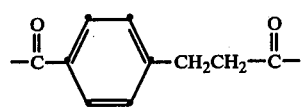

(A)

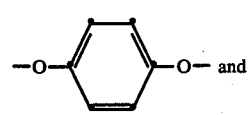

(B)

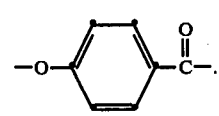

(C)

2 Claims, No Drawings

LIQUID CRYSTAL COPOLYESTERS CONTAINING 4-CARBOXYBENZENEPROPIONIC ACID

This invention relates to liquid crystal copolyesters which have enhanced heat stability.

In the last four decades, a wide variety of plastics has been developed to fulfill a wide variety of uses. Starting with the commercial introduction of nylon 66 in 1938 and continuing with the introduction of polyacetal, polycarbonate, polyphenylene oxide, polysulfone and polytetramethylene terephthalate, new plastics have been continually introduced to overcome deficiencies in previous plastics. As plastics were developed to satisfy ever more demanding requirements, the aromatic character of the polymer often increased. As the amount of aromatic character increased, the melting point of the polymer increased. Ultimately, the increased melting point of highly aromatic polymers became so high that melt processing the polymer challenged the heating capacity of even the most sophisticated melt spinning and molding equipment and even approached the thermal stability limit of the polymers themselves. Thus, as the demand for polymers with greater and greater mechanical properties was met, the melting point of the polymers generally went up.

In very recent years the never-ending search for polymers with greater and greater mechanical properties has resulted in a fundamental breakthrough in polymer science by development of a new class of polymers exhibiting a general overall balance of mechanical properties substantially enhanced over previous polymers. These polymers have been described by various terms, including "liquid crystalline", "liquid crystal", and "anisotropic". The polymers of this new class are thought to involve a parallel ordering of the molecular chains and are prepared from monomers which are generally long, flat, and fairly rigid along the long axis of the molecule.

Although the exact structure of liquid crystal polymers has not yet been fully understood, liquid crystal polymers are known to have exceptionally high mechanical properties compared to analogous polymers not having a liquid crystal character. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

Although liquid crystal polyesters have high mechanical properties, the heat stability of some of these polyesters is deficient. By the term "heat stability" we mean the propensity of the overall balance of mechanical properties of the polyester to diminish upon prolonged exposure of the polyester to elevated temperatures.

Heat stability is an important property for many polyester applications. For example, if a polymer is used close to an automobile engine or in an electronic application in which the parts become heated because of hot vacuum tubes, heat stability of the polymer is required. We have now discovered a liquid crystal copolyester which exhibits typical high liquid crystal mechanical properties and has high heat stability. We have accomplished this objective by using 4-carboxybenzenepropionic acid in a polyester along with hydroquinone and a p-acyloxybenzoic acid.

Our invention, therefore, is a copolyester prepared from 4-carboxybenzenepropionic acid, a diacyl ester of hydroquinone and a p-acyloxybenzoic acid and can be defined as a copolyester having a fiber-forming molecular weight consisting essentially of the following divalent radicals:

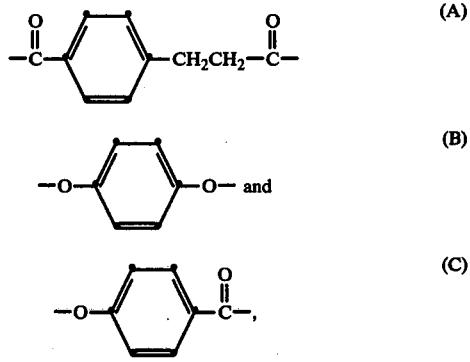

wherein the range of radical (C) is 10 to 90 mole percent, based on the sum of radicals (A) and (C). In a preferred embodiment the range of radical (C) is from 30 to 80 mole percent.

As will also be recognized by those skilled in the art, divalent radical (A) is the divalent radical remaining after removal of the hydroxyl groups from 4-carboxybenzenepropionic acid, divalent radical (B) is the radical remaining after removal of the terminal hydrogen atoms from hydroquinone, and divalent radical (C) is the radical remaining after removal of the acyl and hydroxyl groups from a p-acyloxybenzoic acid.

Applicants are aware of a large volume of prior art relating to the copolyesters of this invention.

U.S. Pat. No. 3,778,410 discloses a process for preparing a polyester by reacting a polyester prepared from a dicarboxylic acid and hydroquinone with a p-acyloxybenzoic acid.

U.S. Pat. No. 3,637,595 discloses liquid crystal copolyesters prepared from terephthalic acid, hydroquinone and p-hydroxybenzoic acid.

German Offenlegungsschrift No. 2,520,820 discloses that if certain limitations regarding amounts of certain structures are observed, one can prepare a liquid crystal polyester from the following divalent radicals:

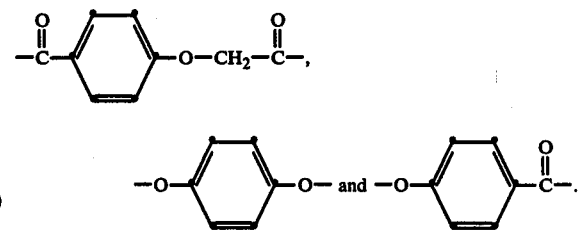

U.S. Pat. No. 3,368,998 discloses polyesters prepared using 4-carboxybenzenepropionic acid and asymmetrical diols.

Applicants regard the closest prior art to be the combination of the German Offenlegungsschrift and U.S. Pat. No. 3,368,998.

Since the German Offenlegungsschrift discloses liquid crystal polyesters composed of the following radicals:

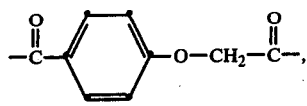

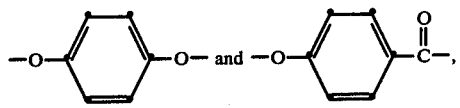

and U.S. Pat. No. 3,368,998 shows polyesters containing the radical

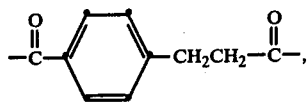

it would be prima facie obvious to prepare applicants' claimed polyesters composed of radicals

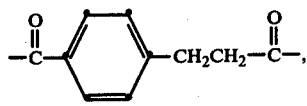

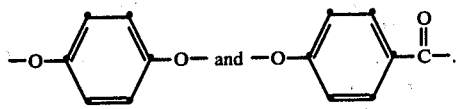

Or, to state the matter another way, it would be prima facie obvious to substitute a —CH$_2$— group for a —O— group in the dicarboxylic acid component.

The polyesters of this invention are thought to be unobvious because when a —CH$_2$— group is used to replace the —O— group the resulting polyester has unobvious heat stability compared to the heat stability of the —O— group containing polyester.

The unobvious heat stability of the polyesters of this invention can be appreciated by considering the following laboratory work comparing the heat stability of the polyesters of the invention containing the

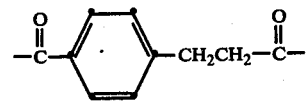

radical with the heat stability of the polyesters of the prior art containing the radical

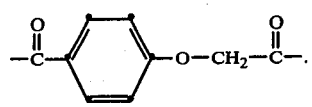

A first polyester illustrating the invention is prepared from 20 mole percent 4-carboxybenzenepropionic acid, 80 mole percent p-acyloxybenzoic acid and 20 mole percent hydroquinone dipropionate.

A mixture of 14.4 g. (0.08 mole) p-acetoxybenzoic acid, 3.88 g. (0.02 mole) 4-carboxybenzenepropionic acid, and 4.44 g. (0.02 mole) hydroquinone dipropionate is placed in a 100-ml. flask equipped with a stirrer, a short distillation column, and an inlet for nitrogen. The flask is evacuated and purged three times with nitrogen before being lowered into a metal bath maintained at 110° C. The mixture is heated under a nitrogen atmosphere with stirring to a temperature of 260° C. at which point acetic acid begins to distill rapidly from the flask. After the reaction mixture is heated with stirring at this temperature for about 1 hour, the temperature of the batch is increased to 300° C. for 30 minutes and then to 350° C. A vacuum of 0.5 mm of mercury is then applied over a period of 10 minutes. After stirring is continued under 0.5 mm of mercury at 350° C. for about 10 minutes, a medium melt viscosity, opaque, fibrous, light tan polymer is obtained.

A second polyester illustrating the prior art is prepared in a similar manner, except 4-carboxybenzeneoxyacetic acid is used in place of the 4-carboxybenzenepropionic acid in the first polyester and the final reaction temperature is 340° C. to limit the considerable color formation. A third polyester illustrating the invention is prepared in a similar manner from 50 mole percent 4-carboxybenzenepropionic acid, 50 mole percent p-acyloxybenzoic acid and 50 mole percent hydroquinone dipropionate. A fourth polyester illustrating the prior art is prepared in a similar manner, except 4-carboxybenzeneoxyacetic acid is used in place of the 4-carboxybenzenepropionic acid in the third polyester and the final reaction temperature is 325° C. to limit color formation.

Ten mil films of all four of these polyesters are pressed at temperatures ranging from 325° to 350° C. and are placed in a 150° C. forced air oven. Once a week the films are creased by hand. The number of weeks required for the film to break upon creasing is recorded as heat stability. The following table summarizes the heat stability data for all four polyesters.

| Polymer | Mole Percent —C(O)—〈benzene〉—CH$_2$CH$_2$—C(O)— | Mole Percent —C(O)—〈benzene〉—O—CH$_2$—C(O)— | Heat Stability, Weeks to Breaking Upon Creasing Film |
|---|---|---|---|
| 1 | 20 | | ≧20 |
| 2 | | 20 | 4 |
| 3 | 50 | | 8 |
| 4 | | 50 | 2 |

As can be appreciated by considering the above data, the heat stability of the polyester of the invention containing the

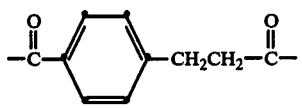

radical is unobvious compared to the heat stability of the polyester of the prior art containing the same amount of the

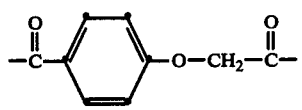

radical. For example, Polymer 1, illustrating the invention, has a heat stability of at least 20 weeks, or at least a 400 percent increase over Polymer 2, illustrating the prior art, having only a heat stability of 4 weeks. Also, Polymer 3, illustrating the invention, has a heat stability of 8 weeks, or about 300 percent greater than Polymer 4, having a heat stability of only 2 weeks.

The copolyesters of the invention can be prepared by a conventional acidolysis procedure, such as described above, whereby 4-carboxybenzenepropionic acid, a diacyl ester of hydroquinone and a p-acyloxybenzoic acid are contacted under an increasing temperature ranging up to about 340°–380° C. and a decreasing pressure to form a high molecular weight polymer. If the polyester solidifies prior to achieving the desired molecular weight, solid-phase polymerization may be used to increase the molecular weight of the copolyesters of the invention by heating polymer particles in an inert atmosphere or under reduced pressure at a temperature below that at which the particles will become tacky and tend to fuse together. Since this thermal treatment may give polymers with increased crystallinity and melting points, melt phase polymerization is preferred. Solid-phase polymerization is preferred, however, if the melting point is above 360° C.

The 4-carboxybenzenepropionic acid can be prepared by methods well known in the art. For example, 4-carboxybenzenepropionic acid can be readily prepared by hydrogenation of p-carboxycinnamic acid.

A wide variety of diesters of hydroquinone can be used to prepare the copolyesters of this invention. Examples of diesters of hydroquinone include the diacetate, dipropionate, dibutyrate and dibenzoate. The diacetate and dipropionate are preferred.

The p-acyloxybenzoic acid that provides radical (C) in the copolyesters of this invention corresponds to the structure

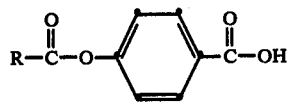

wherein R is phenylene or a monovalent alkyl radical of 1 to 8, preferably 1 to 4, carbon atoms. Examples of p-acyloxybenzoic acids include p-acetoxybenzoic acid, p-propionyloxybenzoic acid, p-butyryloxybenzoic acid, and p-phenoxybenzoic acid. Preferably, R is a monovalent alkyl radical having one carbon atom, in which case the p-acyloxybenzoic acid is p-acetoxybenzoic acid.

The p-acyloxybenzoic acids can be prepared by conventional processes, such as reaction between p-hydroxybenzoic acid and a carboxylic anhydride, such as acetic anhydride. Other processes for preparation of the p-acyloxybenzoic aromatic carboxylic acids are well known in the art.

The copolyesters of this invention are described as "consisting essentially of" the various radicals. By the term "consisting essentially of" we mean that the copolyester can contain other divalent radicals, even in significant amounts, as long as the heat stability of the copolyesters of the invention remain unobvious in view of the heat stability of similar copolyesters. For example, minor amounts of other dicarboxylic acids, such as terephthalic acid or 2,6-naphthalenedicarboxylic acid can be used. Also, substituted hydroquinones such as chloro, bromo and methyl hydroquinone can be used. By the term "consisting essentially of" we mean also that the copolyesters of this invention may contain nucleating agents, fillers, pigments, glass fibers, asbestos fibers, antioxidants, stabilizers, plasticizers, lubricants, fire-retardants, and other additives.

The inherent viscosity of many of the copolyesters of this invention cannot be determined because they are insoluble in typical solvents used for determining inherent viscosity. Although the inherent viscosity of many of the copolyesters of the invention has not been measured, the molecular weights of all the copolyesters of the invention are high enough to be in the fiber-forming range. The minimum fiber-forming molecular weight of the polymer is thought to be around 5,000. In most cases copolyesters of the invention have molecular weights above 8,000 and can have molecular weights as high as around 20,000 and in some instances the molecular weights can range up to 25,000 or even higher.

We claim:

1. A copolyester having a fiber-forming molecular weight consisting essentially of the following divalent radicals:

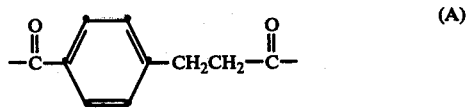

(A)

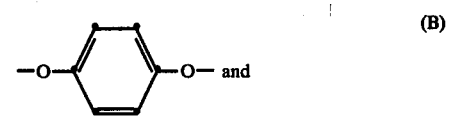

(B)

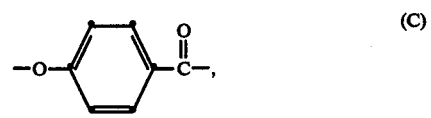

(C)

wherein the range of radical (C) is 10 to 90 mole percent, based on the sum of radicals (A) and (C).

2. The copolyester of claim 1 wherein the range of radical (C) is from 30 to 80 mole percent.

* * * * *